Figure 1:
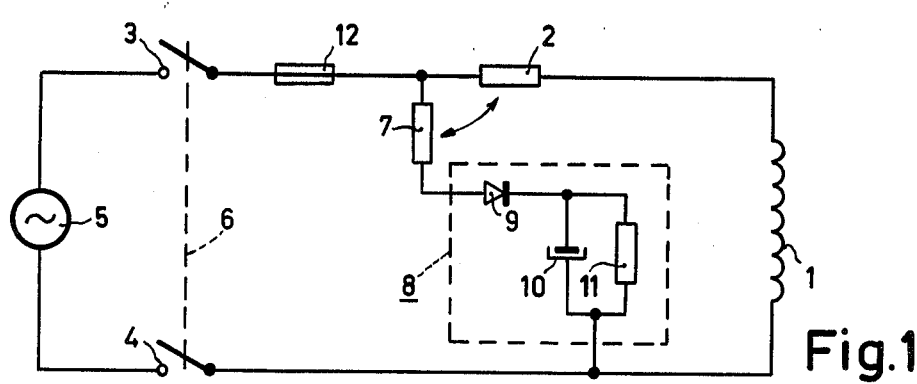

United States Patent [19]

Slegers

[11] 4,164,775
[45] Aug. 14, 1979

[54] DEGAUSSING CIRCUIT IN A COLOR TELEVISION RECEIVER

[75] Inventor: Frans Slegers, Eindhoven, Netherlands

[73] Assignee: U.S. Philips Corporation, New York, N.Y.

[21] Appl. No.: 808,043

[22] Filed: Jun. 20, 1977

[30] Foreign Application Priority Data

Jul. 14, 1976 [NL] Netherlands .......................... 7607758
Dec. 24, 1976 [NL] Netherlands .......................... 7614382

[51] Int. Cl.² .............................................. H01F 13/00
[52] U.S. Cl. ...................................... 361/150; 315/8; 361/267
[58] Field of Search ...................... 315/8; 361/150, 267

[56] References Cited

U.S. PATENT DOCUMENTS

| 3,495,136 | 2/1970 | Gerritsen et al. ..................... 361/150 |
| 3,571,652 | 3/1971 | Shiobara ................................... 315/8 |
| 3,617,800 | 11/1971 | Ishikawa et al. ..................... 361/150 |
| 3,619,703 | 11/1971 | Yamashita et al. ..................... 315/8 |
| 4,024,427 | 5/1977 | Belhomme ............................ 361/150 |

*Primary Examiner*—Gerald Goldberg
*Attorney, Agent, or Firm*—Thomas A. Briody; William J. Streeter

[57] ABSTRACT

A degaussing circuit for a color television receiver, in which the degaussing coil is in series with a PTC thermistor to which an NTC thermistor is thermally coupled and which is at the same time a protection resistance for a supply voltage circuit in the receiver.

9 Claims, 7 Drawing Figures

DEGAUSSING CIRCUIT IN A COLOR TELEVISION RECEIVER

The invention relates to a degaussing circuit for demagnetizing ferromagnetic components in a colour television receiver, comprising the series arrangement of a degaussing coil and a thermistor with a positive temperature coefficient, which series arrangement is connectable to at least one terminal of an a.c. voltage source and furthermore comprising a resistance element for contributing to heating of the thermistor.

Such a circuit is known from German Patent Specification No. 1,282,679. In order to reduce the current which flows through the degaussing coil at the end of the process, which current might produce an unwanted magnetic residual field in the ferromagnetic components to be demagnetized the thermistor is raised by means of a resistance element already present in the receiver to a higher temperature than the temperature which would be produced by the final current alone. For this results in a further increase in the resistance value of the thermistor.

In practice, in the known circuit a wire-wound resistor with a high permissible power can be used as resistance element, which wire-wound resistor is arranged in the immediate vicinity of the thermistor. However, the drawback of this measure is that the temperature of the wire-wound resistor cannot be controlled so very well so that the difference between the maximum permissible temperature of the thermistor and the ambient temperature cannot be checked with certainty. Consequently, the risk of overheating, which may be destructive to the thermistor, is not excluded. For this reason the circuit is no longer used.

It is an object of the invention to avoid said drawback of the known circuit whilst also the costs can be reduced and to that end the circuit according to the invention is characterized in that the resistance element is a (second) thermistor with a negative temperature coefficient which is connectable to a terminal of the a.c. voltage source and which is thermally coupled to the (first) thermistor with a positive temperature coefficient, the second thermistor being at the same time a protection resistance for a rectifier circuit in the receiver.

By means of heat transfer from the second to the first thermistor the latter attains, as wanted, a higher temperature. As the current through the second thermistor soon assumes a value which substantially does not depend on the degaussing circuit and which cannot exceed a given maximum, an equilibrium condition is obtained whereafter the temperature cannot increase to an appreciable extent so that the circuit according to the invention is safe. It will be noted that degaussing circuits having two thermally intercoupled thermistors having temperature coefficients of the opposite sign are known per se. U.S. Pat. No. 3,495,136 discloses a circuit which includes such a combination. The publication "IEEE Transactions on Broadcast and Television Receivers" Vol. BTR 1972, No. 1, pages 7 to 9 inclusive describes degaussing circuits in which a thermistor having a negative temperature coefficient is included in series with a supply voltage circuit. However, this thermistor is not thermally coupled to a thermistor having a positive temperature coefficient.

Figure 2:
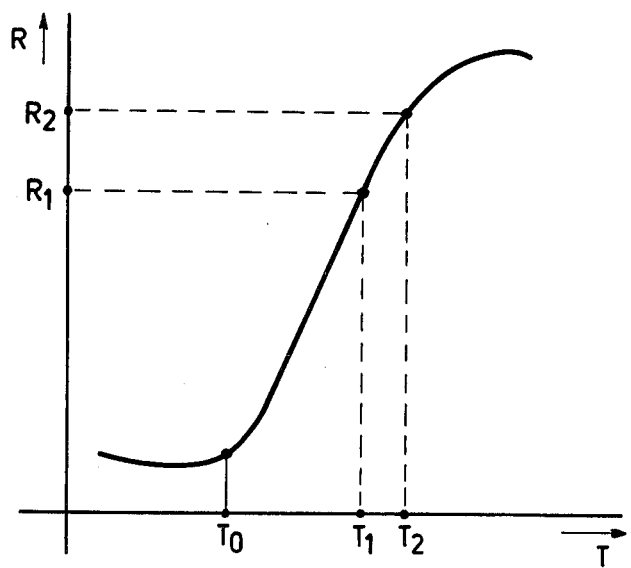
Figure 3:
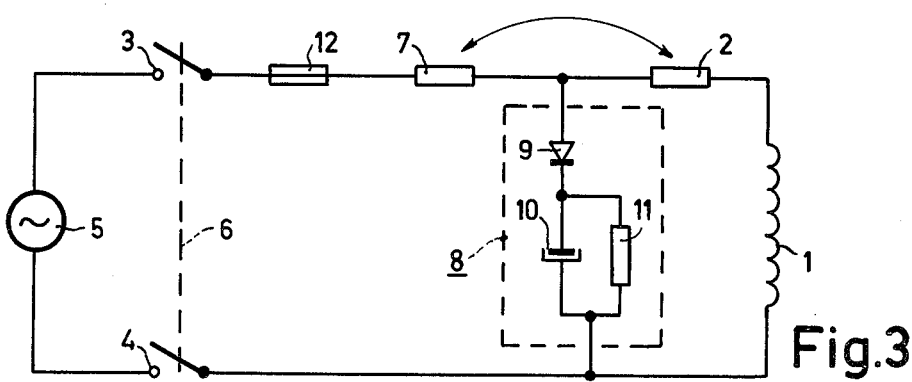
Figure 4:
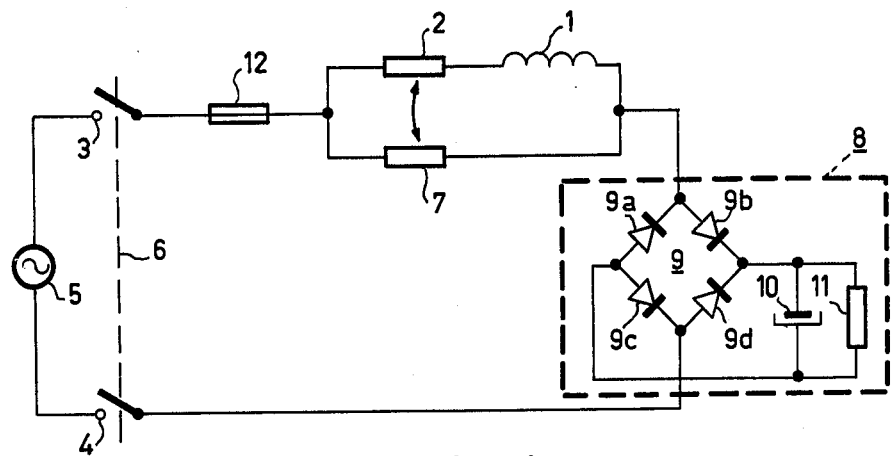
Figure 5A:
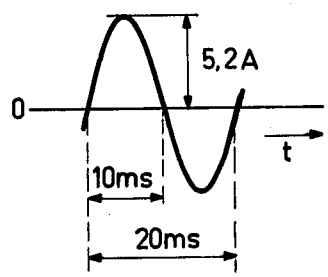
Figure 5B:
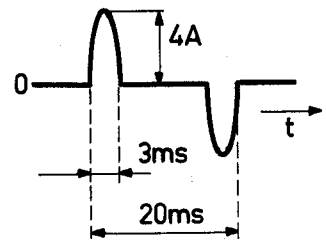
Figure 6:
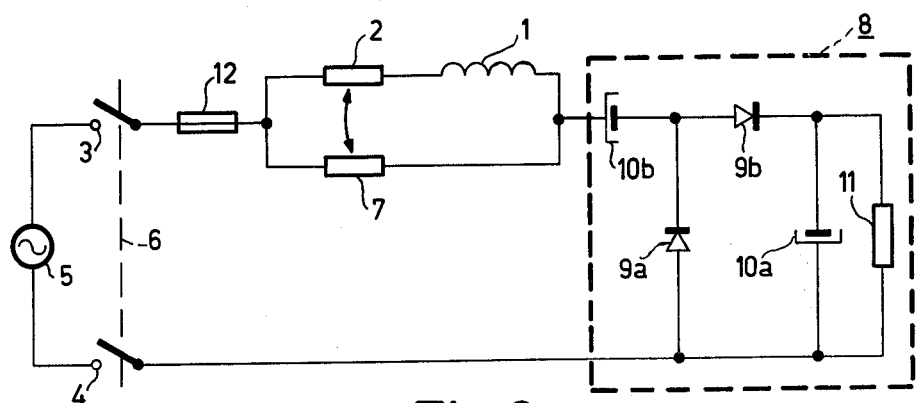

The invention will be further explained by way of non-limitative example with reference to the accompanying figures wherein FIG. 1 shows a first construction of the circuit according to the invention, FIG. 2 is a characteristic curve for explaining the invention, FIG. 3 shows a second construction of the circuit according to the invention, FIG. 4 shows a third construction of the circuit according to the invention, FIGS. 5a and 5b are waveforms occurring therein and FIG. 6 shows a fourth construction of the circuit according to the invention.

In FIG. 1 a degaussing coil 1 of a partly shown colour television receiver having a display tube of the shadow mask type is in series with a thermistor 2. The series arrangement of a second thermistor 7 and a rectifier circuit 8 is in parallel with the series arrangement of coil 1 and thermistor 2. Thermistor 7 has a negative temperature coefficient, whilst thermistor 2 has a positive temperature coefficient. The thermistors are thermally coupled because they have been brought into intimate contact with one another which is indicated in FIG. 1 by means of a double arrow. The parallel circuit constituted by components 1, 2, 7 and 8 can be connected through a switch 6 to the terminals 3 and 4 of an A.C. voltage source 5, for example the electric power supply mains.

Rectifier circuit 8 is diagrammatically shown in FIG. 1 as the series arrangement of a rectifier 9 and the parallel arrangements of a supply capacitor 10 of a high capacitance and a load 11. In operation the rectifier 9, which may consist in known manner of one or more diodes, rectifies the mains voltage of source 5 so that a D.C. voltage is available across capacitor 10 for feeding further parts of the receiver. A direct current flows through these parts. So load 11 represents a resistance whose value is equal to the ratio of said d.c. voltage to this direct current. Of course the receiver may comprise further supply circuits, not shown, for example for generating D.C. voltages of different values as well as one or more mains transformers.

In the cold condition thermistor 2 has a comparatively low resistance value (of approximately 25 Ohm), whilst thermistor 7 has a comparatively high value (of approximately 70 Ohm). Immediately after switch-on of mains switch 6 a large current flows through the thermistor 2 and coil 1 of approximately 5 A (peak value) or more. Because the series arrangement of the thermistor 7 and rectifier circuit 8 is in parallel with the source 5 the current therethrough is at the start independent of the degaussing current which flows through the branch 1, 2. The currents through both thermistors are able to heat them in a rather short time (approximately 10 seconds).

FIG. 2 shows on a logarithmic scale the resistance value R of thermistor 2 plotted as a function of the temperature T. Above the so-called Curie-temperature $T_o$ (approximately 75° C.) the specific resistance of the material from which the thermistor 2 consists and consequently also its resistance value increases very steeply. In the absence of thermistor 7 thermistor 2 would attain, owing to self-heating, a temperature $T_1$ (approximately 130° C.) with a corresponding resistance value $R_1$ of approximately 20 kOhm, the amplitude of the degaussing current would then be brought to a value of approximately 20 mA.

When the temperature increases the resistance value of thermistor 7 decreases. The current through this thermistor is mainly determined by the values of the voltage across and of the current through load 11, which values, in the warm condition, are substantially independent of the temperature of thermistors 2 and 7 and of the degaussing circuit. For, they only depend on the operating conditions of the various parts of the receiver which are provided with supply voltage by circuit 8. Said current cannot, for example owing to the action of a safety circuit, exceed a given maximum.

The final value of thermistor 7 is low, for example, approximately 1 Ohm and a current of 1.5 A (r.m.s. value) and a temperature of 175° C. Thermistor 7 is chosen such that even for the smallest possible current through it, depending on load 11, it attains a final temperature which is higher than $T_1$. Consequently, thermistor 7 delivers heat to thermistor 2. As a portion of the heat radiated by the thermistor 7 yet goes to the environment the final temperature of thermistor 2 will be lower than that of thermistor 7. Owing to the heat transfer thermistor 7 attains a final temperature $T_2$ which is approximately 20° to 30° C. higher than $T_1$. An equilibrium condition occurs wherein the final temperature of thermistor 7 is lower than the final temparature without thermal coupling to thermistor 2 and wherein both thermistors are approximately kept at said final temperatures by the final currents. This situation is stable and, consequently, safe: for an increase in temperature $T_1$ causes a decrease in the current through thermistor 2 which opposes the increase in the temperature. It also prevents the temperature from rising too high which might cause the resistance value R to decrease. The final value $R_2$ of thermistor 2 is higher than $R_1$, namely approximately 60 kOhm and the final amplitude of the current through coil 1 is reduced to the desired value, i.e. less than 5 mA.

In the preceding the dissipation in coil 1 in the final condition is assumed to be negligibly small with respect to that in thermistor 2. This is justified by the fact that the ohmic resistance value (approximately 20 Ohm) of coil 1 is much lower than value $R_2$ so that the output voltage drop across coil 1 is negligibly small.

Thermistor 7 is a safety resistor for rectifier circuit 8. Because prior to switch-on of mains switch 6 capacitor 10 is still uncharged a very large current would flow through rectifier 9 and capacitor 10 after switch-on if thermistor 7 would be absent. This might cause damage to these components and also to switch 6. It would also be possible that a fuse 12 which in FIG. 1 is included between switch 6 and the junction point of thermistors 2 and 7 would melt. The starting current is limited by thermistor 7 whilst the thermistor substantially produces no voltage drop in the hot condition.

Compared with the case wherein thermistor 7 is replaced by a linear resistor the circuit according to the invention means a considerable saving in energy. For, the final value of thermistor 7 is lower than the value of the linear resistance i.e. the above-mentioned starting value (approximately 70 Ohm) of thermistor 7 whereas the value of the rectified voltage across capacitor 10 is only decreased during the warming up time of thermistor 7.

There is an additional advantage, namely the fact that after switch-on of mains switch 6 the current derived by circuit 8 from source 5 grows gradually and not suddenly which attenuates the jump produced by circuit 1, 2.

FIG. 3 shows a second construction of the circuit according to the invention, with the same reference numerals as in FIG. 1 wherein the rectifier circuit 8 is in parallel with the series arrangement of coil 1 and thermistor 2, whilst thermistor 7 is included between mains switch 6 and the junction of thermistor 2 and circuit 8. In this construction thermistor 7 limits the switch-on value also for the degaussing current so that for both thermistors types must be chosen which each have a lower starting value than in the case of FIG. 1. In the final state there is substantially no difference between the two constructions.

It will be noted that in the two described constructions of the circuit thermistor 7 has a dual function, namely protecting the rectifier circuit 8 and increasing the final value of thermistor 2 and, consequently, reducing the final degaussing current, which means a saving compared with the case where the degaussing circuit is constructed in a known manner, for example with two thermally inter-coupled thermistors with positive temperature-coefficients, whilst thermistor 7 or a linear resistor in the same position is not coupled herewith.

In FIG. 4 thermistor 7 is in parallel with the series arrangement of degaussing coil 1 and thermistor 2. The circuit constituted by components 1, 2 and 7 can be connected through fuse 12 and switch 6 to terminal 3 of a.c. voltage source 5. In this example rectifier 9 is of the Graetz-type: four diodes 9a, 9b, 9c and 9d form a bridge in a diagonal whereof components 10 and 11 are included, whilst a point of the other diagonal is connected to that junction of series arrangement 1, 2 and thermistor 7 which is not connected to mains switch 6. The other point of said diagonal is connectable through switch 6 to the other terminal 4 of source 5.

In the cold state thermistor 2 has a comparatively low resistance value (of approximately 4 Ohm), whereas thermistor 7 has a comparatively high value (of approximately 150 Ohm). Capacitor 10 has as yet no charge. In this circuit coil 1 has an ohmic resistance value of approximately 100 Ohm. Immediately after switch-on of mains switch 6, the voltage of the source 5 is substantially completely across the parallel circuit constituted by components 1, 2, 7. If this voltage has an effective value of 220 V then a current of approximately 3.1 A (peak value) flows through thermistor 2 and coil 1, whilst a current of approximately 2.1 A flows through thermistor 7 which in the beginning is independent of the degaussing current flowing through branch 1, 2.

FIG. 5a represents one cycle of the current which flows through rectifier 9, at the start of the procedure. Herein it is assumed that the frequency of the mains voltage is 50 Hz which corresponds to a cycle of 20 ms. When capacitor 10 is discharged diodes 9a and 9d or 9b and 9c respectively conduct during the entire half cycle, that is to say that opening angle thereof is equal to 10 ms.

After switch-on the degaussing current through coil 1 gradually decreases, on the one hand, because the resistance value of thermistor 2 becomes higher when the thermistor becomes warmer and on the other hand because capacitor 10 is being charged. In addition, when the temperature increases the resistance value of thermistor 7 decreases. The final value thereof is low, for example approximately 2 Ohm. As in FIG. 1 and 3, thermistor 2 attains a final temperature $T_2$ which exceeds the final temperature $T_1$ which would be attained by self-heating in the absence of thermistor 7, which causes the final valve of thermistor 2 to become higher. The final amplitude of the degaussing current is consequently reduced to the desired value. This final state is stable and, consequently, safe.

FIG. 5b represents one cycle of the current flowing through rectifier 9 at the end of the process. The value thereof depends on the value of load 11; in a given receiver a peak value of approximately 4A was measured at an opening angle for the rectifying diodes of approximately 3 ms. It will be noted that the degaussing current through coil 1 is substantially of the same form as the currents in FIG. 5a and 5b as the reactance of the coil at low frequencies may be neglected relative to the ohmic resistance value hereof. FIGS. 5a and 5b show that the shape of the current is substantially symmetrical relative to the zero value. A condition for this is that the decrease in the amplitude of the degaussing current does not take place too rapidly, which decrease is determined by the product of the resistance value of the circuit 1, 2, 7 and the capacitance of capacitor 10. Because the capacitance is determined by the permissible amplitude of the ripple voltage across load 11 said condition implies a minimum value for this resistance and, consequently, of the initial resistance value of thermistor 7 and of the ohmic resistance value of the degaussing coil, whilst maintaining the magnetic properties thereof. In the example of FIG. 4 capacitor 10 has a capacitance of 200 $\mu$uF whilst said resistance value is approximately 60 Ohm in the cold state so that said product is approximately equal to 12 ms, that is to say in the order of magnitude of 50 to 60 % of the duration of the cycle.

The reason why the shape of the current must be substantial symmetrical relative to the zero value, the negative and the positive peak values being consequently substantially equal to one another, is that the degaussing current should substantially not contain a direct current component, which component would generate an unwanted magnetic field. When using a Graetz-rectifier as is the case in FIG. 4, the degaussing current reverses its direction at each half cycle as the current alternatingly flows either through diodes 9b and 9c or through diodes 9d and 9a. A single-phase rectifier in which the current does not reverse may not be used for the construction of FIG. 4. FIG. 6 represents a rectifier of the voltage doubler type which may be used. Herein rectifier circuit 8 comprises two diodes 9a and 9b and two capacitors 10a and 10b. It is obvious that the degaussing current which also flows through capacitor 10b comprises no direct current component. It is also obvious that the circuit 1, 2, 7 may be included in the supply lead to terminal 4 which, of course, also applies to the construction in FIG. 4. It can be noted that the single-phase rectifier, shown in FIG. 3, produces a d.c. voltage drop across thermistor 7. Consequently, also in this construction, reference should be given a Graetz rectifier.

In FIGS. 4 and 6 the initial current is limited by components 1, 2 and, especially, 7. It will be noted that thermistor 2 always has a rather low voltage drop across it, both in FIG. 4 and in FIG. 6. For, at the beginning of the process the voltage of source 5 is found substantially fully across coil, 1, which has a much higher ohmic resistance value, whilst the voltage across the series circuit 1, 2 at the end of the process is low, as thermistor 7 which is now low-ohmic substantially short-circuits said series arrangement. The advantage thereof is that thermistor 2 may be much thinner than thermistor 2 in FIGS. 1 and 3, that is to say 0.5 to 0.7 mm instead of approximately 2 mm, which means a considerable saving in material. It is consequently cheaper. In addition, the dissipation is much lower and the loss of heat to the environment much lower. The preceding also applies with respect of thermistors which in known circuits are in series with the degaussing coil and which, at least at the beginning of degaussing must be able to withstand a high voltage.

What is claimed is:

1. A degaussing circuit for demagnetizing ferromagnetic components in a colour television receiver, said circuit comprising a rectifier circuit, the series arrangement of a degaussing coil and a first thermistor with a positive temperature coefficient, said series arrangement is connectable to at least one terminal of an alternating current voltage source, and furthermore comprising a resistance element means for contributing to heating of the first thermistor and for protecting said rectifier circuit comprising a second thermistor with a negative temperature coefficient which is connectable to a terminal of the alternating current voltage source and which is thermally coupled to the first thermistor with a positive temperature coefficient, the second thermistor being connected to said rectifier circuit in the receiver.

2. A circuit as claimed in claim 1, wherein said rectifier circuit comprises a rectifier having a current which also flows through the second thermistor, and the temperature of the second thermistor in the final operating state exceeds the temperature of the first thermistor.

3. A circuit as claimed in claim 2, wherein the second thermistor is connected in series with the rectifier circuit, the series arrangement thus formed being connected in parallel with the series arrangement of the degaussing coil and the first thermistor, and both series arrangements being connectable to the terminals of the alternating current voltage source.

4. A circuit as claimed in claim 2, wherein the series arrangement of the degaussing coil and the first thermistor is connected in parallel with the rectifier circuit, thereby forming two juctions, one of the junctions being connectable to a first terminal of the alternating current voltage source, the other juction being connected to the second thermistor, said second thermistor being connectable to the second terminal of the alternating current voltage source.

5. A circuit as claimed in claim 4, wherein the rectifier circuit comprises the Graetz type and a supply capacitor, and the product of the total ohmic resistance value of said parallel circuit in the cold state by the capacitance of said supply capacitor amounts to approximately 50% of the duration of the cycle of the voltage supplied by the alternating current voltage source.

6. A circuit as claimed in claim 2, wherein the second thermistor is connected in parallel with the series arrangement of the degaussing coil and the third thermistor, thereby forming a parallel circuit included in a supply lead of the rectifier, said rectifier comprising a full-wave rectifier of the type that substantially no direct current component can flow through said supply lead.

7. A circuit as claimed in claim 6, wherein the resistance value of the first thermistor in the cold state is more than 20 times lower than the ohmic resistance value of the degaussing coil.

8. A circuit as claimed in claim 6, characterized in that the rectifier circuit is of the Graetz-type and in that the product of the total ohmic resistance value of the said parallel circuit in the cold state by the capacitance of a supply capacitor being part of the rectifier circuit amounts to approximately 50% of the duration of the cycle of the voltage supplied by the a.c. voltage source.

9. A circuit as claimed in claim 6 wherein the rectifier circuit comprises the Graetz type.

* * * * *